(12) United States Patent
Cazaux et al.

(10) Patent No.: US 11,011,065 B2
(45) Date of Patent: May 18, 2021

(54) METHOD AND ELECTRONIC DEVICE FOR MANAGING THE DISPLAY OF AN AIRCRAFT FLIGHT PROFILE WITH SELECTION OF SUITABLE RESOLUTION(S) OF FIELD DATA BASE(S), RELATED COMPUTER PROGRAM AND ELECTRONIC DISPLAY SYSTEM

(71) Applicant: THALES, Courbevoie (FR)

(72) Inventors: Patrick Cazaux, Mérignac (FR); Jérémie Beyer, Mérignac (FR); Benoit Bouhours, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/853,153

(22) Filed: Apr. 20, 2020

(65) Prior Publication Data

US 2020/0342773 A1 Oct. 29, 2020

(30) Foreign Application Priority Data

Apr. 26, 2019 (FR) ..................... 19 04448

(51) Int. Cl.
  *G08G 5/00* (2006.01)
  *B64D 43/00* (2006.01)
  *G01C 21/20* (2006.01)

(52) U.S. Cl.
  CPC .......... *G08G 5/0047* (2013.01); *B64D 43/00* (2013.01); *G01C 21/20* (2013.01)

(58) Field of Classification Search
  CPC ........ G01C 21/20; G01C 23/00; G01C 5/005; G01C 23/005; G08G 5/0047; G08G 5/0086; G08G 5/025
  See application file for complete search history.

(56) References Cited

U.S. PATENT DOCUMENTS

| 5,317,689 A | 5/1994 | Nack et al. |
| 5,995,901 A * | 11/1999 | Owen ................. G01C 23/005 340/974 |
| 6,292,721 B1 * | 9/2001 | Conner ................. G01C 5/005 340/970 |
| 8,718,915 B1 * | 5/2014 | Turcios ............... G08G 5/0086 701/448 |

(Continued)

FOREIGN PATENT DOCUMENTS

EP  3 048 424 A1  7/2016

OTHER PUBLICATIONS

French Search Report, from the French Patent Office in counterpart French Application No. 1904448, dated Jan. 14, 2020.

*Primary Examiner* — Mirza F Alam
(74) *Attorney, Agent, or Firm* — Arent Fox LLP

(57) ABSTRACT

A method for managing the display of an aircraft flight profile may be carried out by an electronic management device intended to be connected to a set of at least one terrain data base. Each terrain data base may have a respective resolution. The method may include selecting at least one resolution, as well as the terrain data base associated with each selected resolution. The method may further include generating data for displaying the flight profile and using each terrain data base selected. The method may also include where each resolution is selected according to a width of a corridor associated with a respective portion of the flight profile.

16 Claims, 7 Drawing Sheets

(56) References Cited

U.S. PATENT DOCUMENTS

| | | | |
|---|---|---|---|
| 8,793,039 B1 * | 7/2014 | Hammack | G08G 5/0021 |
| | | | 701/14 |
| 2003/0193410 A1 | 10/2003 | Chen et al. | |
| 2008/0306639 A1 * | 12/2008 | Fleury | G08G 5/0086 |
| | | | 701/7 |
| 2009/0157241 A1 | 6/2009 | Meunier et al. | |
| 2020/0166374 A1 * | 5/2020 | Gunn | G08G 5/0047 |

* cited by examiner

METHOD AND ELECTRONIC DEVICE FOR MANAGING THE DISPLAY OF AN AIRCRAFT FLIGHT PROFILE WITH SELECTION OF SUITABLE RESOLUTION(S) OF FIELD DATA BASE(S), RELATED COMPUTER PROGRAM AND ELECTRONIC DISPLAY SYSTEM

CROSS-REFERENCE TO RELATED APPLICATIONS

This application is a U.S. non-provisional application claiming the benefit of French Application No. 19 04448, filed on Apr. 26, 2019, which is incorporated herein by reference in its entirety.

FIELD

The present invention relates to a method for managing the display of an aircraft flight profile, the method being carried out by an electronic management device intended to be connected to a set of at least one terrain data base, each terrain data base having a respective resolution.

The invention also relates to a non-transitory computer-readable medium including a computer program comprising software instructions which, when executed by a computer, carry out such a display management method.

The invention also relates to an electronic device for managing the display of an aircraft flight profile.

The invention also relates to an electronic device for managing the display of an aircraft flight profile, comprising a display screen and such an electronic display management device configured to manage the display of the flight profile on the display screen.

BACKGROUND

The invention then relates to the field of man-machine interfaces, also referred to as MMIs, for aircraft handling, preferably intended to be installed in an aircraft cockpit.

The invention particularly relates to the display of an aircraft flight profile on a display screen. The flight profile typically includes a horizontal component, also referred to horizontal flight profile; and a vertical component, also referred to as vertical flight profile. The horizontal flight profile is a projection of the flight profile in a horizontal plane, and the vertical flight profile is a projection of the flight profile in a vertical plane, perpendicular to the horizontal plane.

The display of the flight profile is then generally separated into 2 separate zones, namely a first zone for displaying the horizontal flight profile, also referred to as navigation display and denoted as ND, and a second zone for displaying the vertical flight profile, also referred to as vertical display and denoted as VD.

Conventionally, during the use of a device for managing the display of an aircraft flight profile, a user, such as an aircraft pilot, has the option of selecting the display of the flight profile from among at least two display modes, particularly a tracking mode and a flight plan mode.

When the mode selected for displaying the flight profile is tracking mode, a horizontal axis belonging to said horizontal plane is a line passing through the position of the aircraft and extending along a direction of aircraft movement, or along a direction of extension of the aircraft fuselage, or along a direction of a weather radar, or indeed along a specific direction designated by the user.

When the mode selected for displaying the flight profile is flight plan mode, a horizontal axis is defined by following the segments of the flight plan (rectilinear and curvilinear).

Regardless of the mode selected from among tracking mode and flight plan mode, the reference vertical axis is defined according to the axis of the standard barometric reference or baro-corrected reference altitudes, corresponding to the aeronautical code QNH.

A display management method is known, comprising the selection of at least one resolution, as well as of the terrain data base associated with each selected resolution; then the generation of data for displaying the flight profile and using each terrain data base selected.

The resolution is for example expressed in second(s) of arc, annotated as s/a, the resolution value in second(s) of arc then defining the dimension corresponding to a side of a smaller displayed representative element, such as a pixel. The resolution is also referred to as data base scale. Those skilled in the art will then understand that the lower the resolution, the higher the value thereof expressed in s/a.

A single resolution is for example selected in a predefined manner, and the generation of data for displaying the flight profile is then carried out using the terrain data base associated with this single resolution. A low resolution makes it possible to have a controlled computing resource requirement, while being however detrimental to the precision.

It is also known to use a single terrain data base with a high resolution to display a partial terrain zone, such as a visible zone close to the aircraft of the first segment of a flight plan, and no display of the terrain for the remainder of the display of the vertical flight profile. This makes it possible to have a controlled computing resource requirement, while having a satisfactory display precision, but only for said partial terrain zone.

Alternatively, different resolutions can be selected according to the visible distance for the display of the vertical flight profile, i.e. according to the extent of the range of positions displayed for the vertical flight profile. By way of example, the selected resolution is equal to 12 s/a when the visible distance is 10 Nm, and to 96 s/a when the visible distance is 100 Nm.

U.S. Pat. Nos. 5,936,552, 6,690,298 B1 and 6,720,891 B2, as well as the article "Vertical Situation Display for improved flight safety and reduced operating costs" by David Carbaugh et al, published in issue 20 of the journal Aero in October 2002, describe such methods for managing the display of the aircraft flight profile.

However, such methods for displaying the aircraft flight profile are not optimal.

SUMMARY

The aim of the invention is thus that of providing a method and an electronic device for managing the display of an aircraft flight profile, suitable for offering a precise display of the terrain, while not needing excessive computing resources.

For this purpose, the invention relates to a method for managing the display of an aircraft flight profile, the method being carried out by an electronic management device intended to be connected to a set of at least one terrain data base, each terrain data base having a respective resolution, the method comprising the following steps:

selecting at least one resolution, as well as the terrain data base associated with each selected resolution, generating data for displaying the flight profile and using each terrain data base selected, each resolution being selected according to a width of a corridor associated with a respective portion of the flight profile.

Thus, the display management method according to the invention makes it possible to select each resolution according to a width of a corridor associated with a respective portion of the flight profile.

The selected resolution is then preferably especially low given that the corridor width is high. In other words, for a narrow corridor, the selected resolution will be high, and conversely for a wide corridor, the selected resolution will be low.

This makes it possible to more readily estimate the quantity of terrain data to be processed to display the flight profile. These processing operations therefore make it possible to control the computing resources needed to prepare the terrain cross-section.

The corridor is for example defined in relation to a respective portion of a horizontal components of the flight profile, also referred to as vertical flight profile; and the flight profile intended to be displayed is particularly the vertical flight profile, i.e. the vertical component of the flight profile.

According to further advantageous aspects of the invention, the display management method comprises one or more of the following features, taken in isolation or according to any technically possible combinations:

the set includes a plurality of terrain data bases, and the method comprises, prior to the selection step, a step of splitting the flight profile into a plurality of successive profile portions, each profile portion being associated with a given corridor width, the selection step then being performed for each profile portion;

during the selection step, the selected resolution corresponds to a ratio greater than a predefined error threshold, the ratio being equal to a first lateral error along the corridor associated with the respective profile portion, preferably a maximum lateral error, divided by the corridor width, the first lateral error being dependent on the resolution;

the method further comprises, for each profile portion, after the selection step and prior to the generation step, a step of computing a second lateral error, preferably a median lateral error, along the corridor associated with said profile portion, the second lateral error being dependent on the resolution selected for said profile portion;

during the generation step, the data are then generated, for each profile portion, according to a corrected corridor width, the corrected width being equal to the corridor width minus the computed second lateral error;

the method further comprises, prior to the selection step, a step of limiting each corridor width, the limited width being equal to the corridor width if said width is less than a predefined maximum corridor width, and to the predefined maximum width otherwise;

the predefined maximum corridor width being preferably between 3 Nm and 10 Nm, more preferably between 4 Nm and 8 Nm, and more preferably equal to 4 Nm;

during the selection step, each resolution is selected according to the limited width of the corridor associated with the respective flight profile portion;

during the generation step, the data are generated, for each profile portion, according to the limited corridor width; and the method further comprises a step of displaying the aircraft flight profile, using the data generation during the generation step.

The invention also relates to a non-transitory computer-readable medium including a computer program comprising software instructions which, when executed by a computer, carry out a display management method, as defined above.

The invention also relates to an electronic management device configured to manage the display of an aircraft flight profile, the device being intended to be connected to a set of at least one terrain data base, each terrain data base having a respective resolution, and comprising a selection module configured to select at least one resolution, as well as the terrain data base associated with each selected resolution, and a generation module configured to generate data for displaying the flight profile and using each terrain data base selected, each resolution being selected according to a width of a corridor associated with a respective portion of the flight profile.

The invention also relates to an electronic system for displaying an aircraft flight profile, the system comprising a display screen, a set of at least one terrain data base, each terrain data base having a respective resolution, and an electronic management device configured to manage the display of the flight profile on the display screen, the electronic management device being as defined above and connected to the display screen and to the set of data base(s).

BRIEF DESCRIPTION OF THE DRAWINGS

These features and advantages of the invention will emerge more clearly on reading the following description, given merely by way of non-limiting example, with reference to the appended drawings, wherein.

DETAILED DESCRIPTION

Hereinafter in the description, the expression "substantially equal to" defines a relation of equality within plus or minus 10%, preferably within plus or minus 5%.

Figure 1:
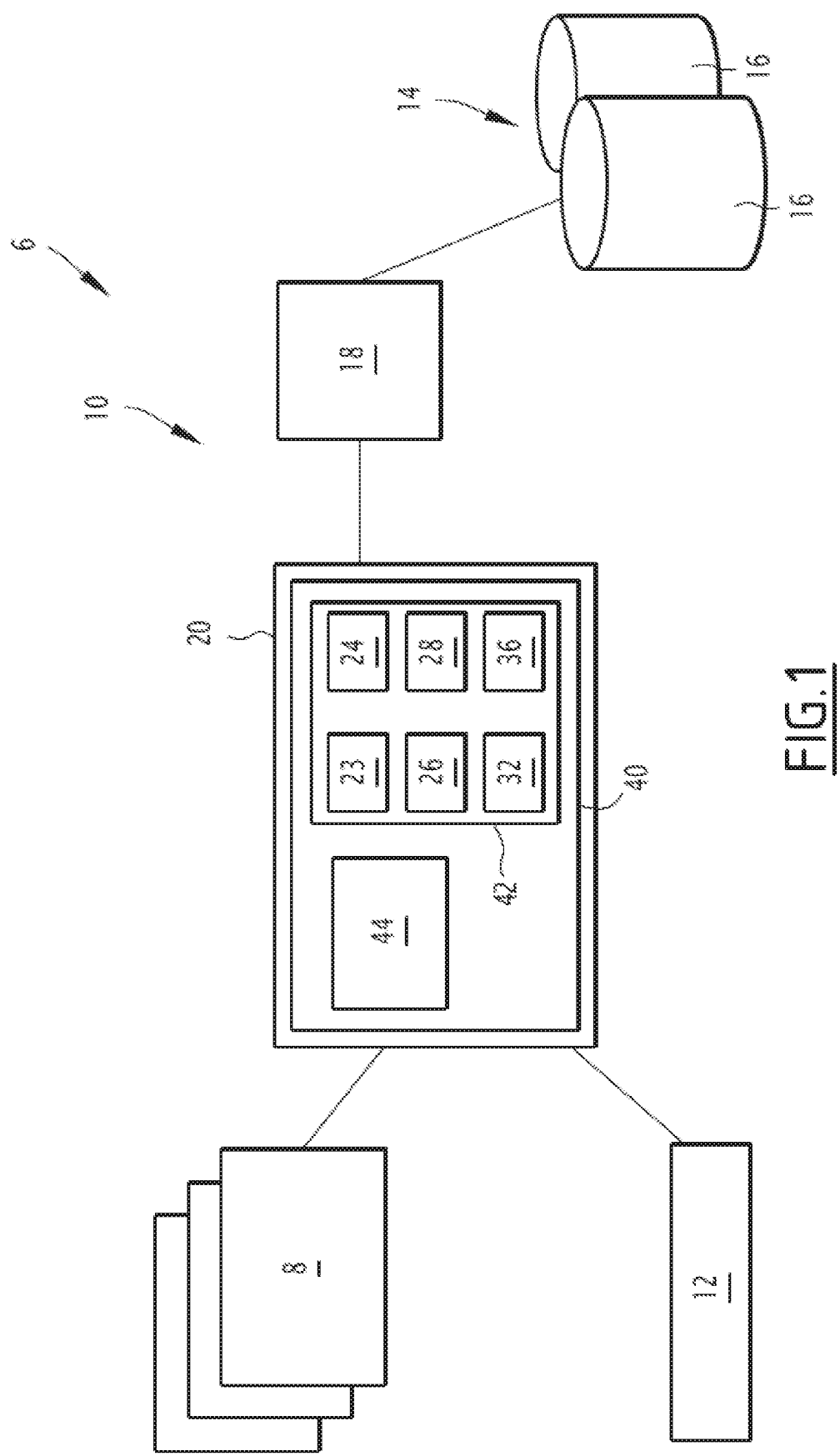
FIG. 1 is a schematic representation of an electronic display system according to the invention, configured to display an aircraft flight profile.

In FIG. 1, an aircraft 6 comprises several avionic systems 8 and an electronic system 10 for displaying a flight profile 12 of the aircraft 6. The aircraft 6 is for example an airplane. Alternatively, the aircraft 6 is a helicopter, or indeed a drone suitable for being handled remotely by a pilot.

The avionic systems 8 are known per se, and are suitable for transmitting to the electronic display system 10 different avionic data, for example so-called "aircraft" data, such as the position, orientation, heading or indeed altitude of the aircraft 6, and/or so-called "navigation" data, such as the flight plan, or the required navigation performance, also annotated as RNP.

The electronic display system 10 is configured to display the flight profile 12 of the aircraft 6. It comprises a display screen 13, a set 14 of terrain data base(s) 16, and an electronic extraction device 18 connected to the set 14 of terrain data base(s) and configured to extract data from each of the terrain data bases 16.

The electronic display system 10 also comprises an electronic management device 20 configured to manage the display of at least one flight profile 12 of the aircraft 6, namely a vertical flight profile $12_V$ and/or a horizontal flight profile $12_H$. The management device 20 is for example connected to the avionic systems 8, to the display screen 13 and to the extraction device 18. In the example in FIG. 1, the extraction device 18, on one hand, and the management device 20, on the other, are two separate electronic devices. In an alternative not shown, the extraction device 18, on one hand, and the management device 20, on the other, form a single electronic device, the extraction device 18 then being integrated in the management device 20.

The flight profile 12 is known per se, and corresponds to an estimation of the path to be followed by the aircraft 6 during the remainder of the flight thereof.

The vertical flight profile $12_V$ is known per se, and is a projection of the flight profile 12 of the aircraft 6 in a vertical plane containing a vertical reference axis and a horizontal reference axis. The vertical reference axis is defined according to the axis of the standard barometric reference or baro-corrected reference altitudes, corresponding to the aeronautical code QNH.

The horizontal profile $12_H$ is also known per se, and is a projection of the flight profile 12 of the aircraft 6 in a horizontal plane perpendicular to the vertical plane.

As known per se, during the use of the management device 20, the user such as a pilot of the aircraft 6, has the option of selecting the display of the flight profile 12 from among at least two display modes, particularly a tracking mode and a flight plan mode.

When the mode selected for displaying the flight profile 12 is tracking mode, the horizontal plane used for the projection of the horizontal profile comprises the horizontal reference axis which is a line passing through the position of the aircraft 6 and extending along a characteristic direction of the aircraft 6, such as the direction of movement thereof, the direction of extension of the fuselage thereof, the direction of a weather radar of the aircraft 6, or indeed a specific direction designated by the user.

When the display mode selected is flight plan mode, a horizontal axis is defined by following the rectilinear and curvilinear segments of the flight plan.

The display screen 13 is known per se, and is a touch screen or indeed a non-touch screen.

The set 14 includes one or more terrain data bases 16, each terrain data base 16 having a respective resolution R. The set 14 preferably includes several terrain data bases 16. In the example in FIG. 2, resolutions R of four respective terrain data bases 16 are represented by way of example separately, namely a resolution R of three seconds of arc, also annotated as 3 s/a, corresponding to a lateral precision of 90 m, a resolution R of 6 s/a corresponding to a lateral precision of 180 m, a resolution R of 12 s/a corresponding to a lateral precision of 360 m and a resolution R of 24 s/a corresponding to a lateral precision of 720 m.

The set 14 includes for example six terrain data bases 16 having a resolution R respectively equal to 1 s/a, 3 s/a, 6 s/a, 12 s/a, 24 s/a and 48 s/a, i.e. from the most resolved data base 16 to the least resolved data base 16.

Those skilled in the art will understand that using a well-resolved data base 16 makes it possible to provide a satisfactory degree or precision, but has the drawback of needing greater computing resources, particularly for storing and processing data from this base. Conversely, a less-resolved data base has the advantage of needing fewer computing resources, but then gives rise to a loss of precision in the stored data.

Figure 2:
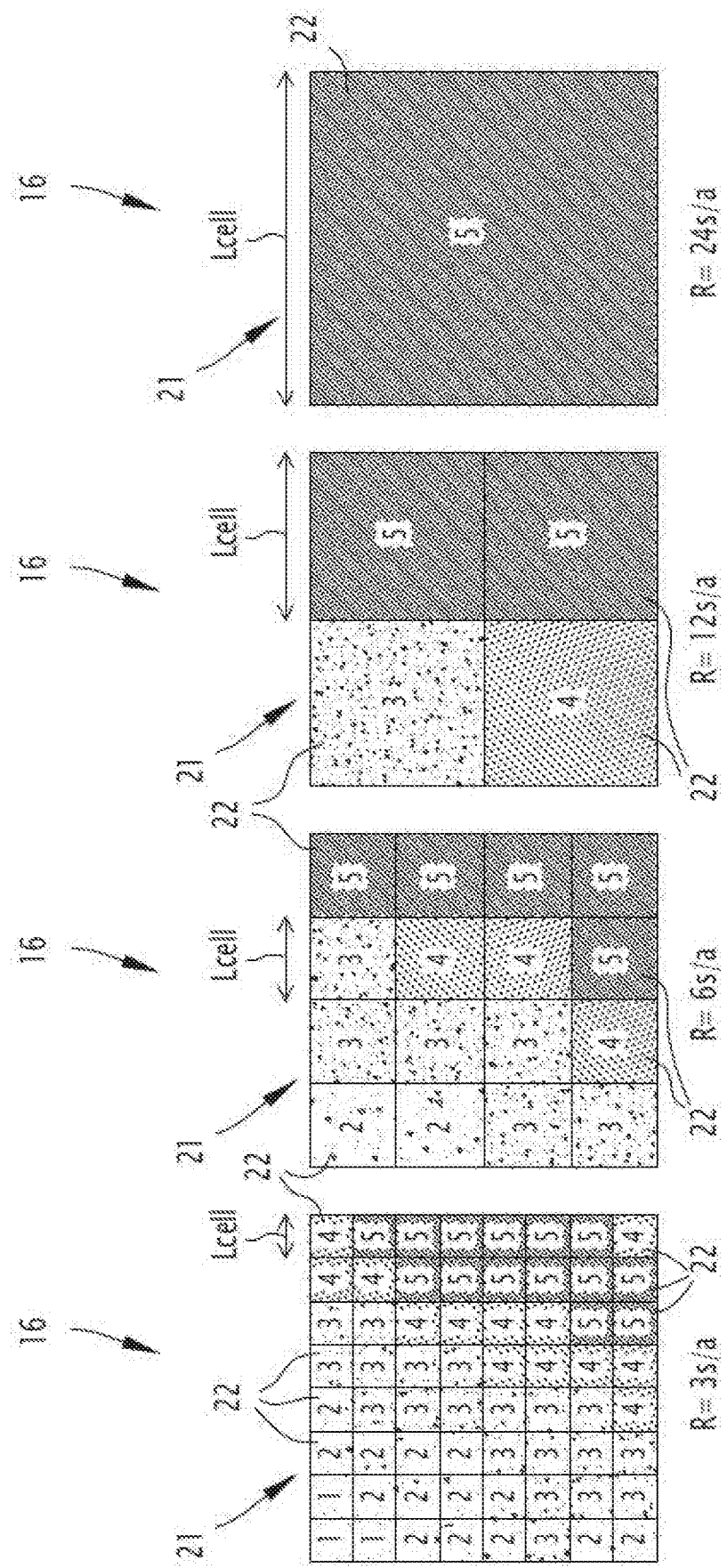
FIG. 2 illustrates different resolutions, expressed in second(s) of arc, annotated as s/a, of terrain data bases used for displaying the flight profile via the display system in FIG. 1.

Each terrain data base 16 includes terrain elevation data, for example obtained from DTED data (Digital Terrain Elevation Data). In a manner equivalent to an image represented in pixel format, the terrain elevation data are for example represented on a grid 21 including a plurality of cells 22, the terrain elevation data then having a respective value for each cell 22, as represented in FIG. 2. Each cell 22 has a width Lcell, expressed in nautical miles and hereinafter annotated as Nm. Those skilled in the art will then understand that the more resolved the terrain data base 16 is, the lower the value of the resolution R thereof, the narrower the width Lcell of the corresponding cell 22, as illustrated in FIG. 2. Each cell 22 is also referred to as a terrain cell. The resolution R of each terrain data base 16 is also referred to as scale.

The extraction device 18 is configured to receive, from the management device 20, different information enabling same to subsequently extract data from the set 14 of terrain data base(s) 16. The information received from the display management device 20 includes, for example, a list of flight plan segments, the corridor width associated with each segment, and a data base scale to be used. The extraction device 18 is configured subsequently to extract data from the set 14 of terrain data bases 16, according to the information received from the management device 20. The data extracted from the terrain data base(s) 16 are for example terrain elevation data on variable surfaces, these data being preferably extracted from different terrain data bases 16 having separate respective resolutions R.

The electronic management device 20 comprises a module 23 for selecting at least one resolution R, as well as the terrain data base 16 associated with each selected resolution R, and a module 24 for generating data for displaying the flight profile 12, using each terrain data base 16 selected.

Optionally additionally, the electronic management device 20 comprises a module 26 for displaying the flight profile 12 of the aircraft 6, using the data generated by the generation module 24.

Also optionally additionally, the electronic management device 20 comprises a module 28 for splitting the flight profile 12 into a plurality of successive profile portions 30, a module 32 for computing a lateral error along a corridor 34 associated with a respective profile portion 30 and a module 36 for limiting a width L of each respective corridor 34.

In the example in FIG. 1, the electronic management device 20 comprises a data processing unit 40 formed for example of a memory 42 and a processor 44 associated with the memory 42.

In the example in FIG. 1, the selection module 23, the generation module 24, as well as optionally additionally the display module 26, the splitting module 28, the computing module 32 and the limiting module 36, are each embodied in the form of software, or a software component, executable by the processor 44. The memory 42 of the electronic management device 20 is then suitable for storing software for selecting at least one resolution R, as well as the terrain data base 16 associated with each selected resolution R, and software for generating data for displaying the flight profile 12. Also optionally additionally, the memory 42 of the electronic management device 20 is suitable for storing software for displaying the flight profile 12 using the data generated by the generation software; software for splitting the flight profile 12 into a plurality of successive profile portions 30; software for computing a respective lateral error along the corridor 34 associated with a respective profile portion 30; and software for limiting the width L of each respective corridor 34. The processor 44 is then suitable for executing each of the software from among the selection software and the generation software, as well as optionally additionally the display software, the splitting software, the computing software and the limiting software.

In an alternative not shown, the selection module 23 and the generation module 24, as well as optionally additionally the display module 26, the splitting module 28, the computing module 32 and the limiting module 36, are each embodied in the form of a programmable logic component, such as an FPGA (Field-Programmable Gate Array), or indeed in the form of a dedicated integrated circuit, such as an ASIC (Application-Specific Integrated Circuit).

When the electronic management device 20 is embodied in the form of one or more software, i.e. in the form of a computer program, it is further suitable for being saved on a computer-readable medium, not shown. The computer-readable medium is for example a medium suitable for storing electronic instructions in memory and for being coupled with a computer system bus. By way of example, the readable medium is an optical disc, a magneto-optical disc, a ROM memory, a RAM memory, any type of non-volatile memory (e.g. EPROM, EEPROM, FLASH, NVRAM), a magnetic card or an optical card. On the readable medium, a computer program comprising software instructions is then stored in memory.

The selection module 23 is configured to select at least one resolution R, as well as the terrain data base 16 associated with each selected resolution R. In particular, the selection module 23 is configured to select each resolution R according to the width L of a corridor 34 associated with a respective portion 30 of the flight profile 12.

Optionally additionally, the selection module 23 is configured to select the resolution R corresponding to a ratio RATIO greater than a predefined error threshold $S_{Err}$, the ratio RATIO being equal to a first lateral error Err_lat_1 along the corridor 34 associated with the respective profile portion 30, divided by the width L of the corridor 34. The first lateral error Err_lat_1 is dependent on the resolution R. The ratio RATIO then verifies for example the following equation:

$$\text{Ratio} = \frac{\text{Err\_lat\_1}}{L} \geq S_{Err} \qquad \text{[Math 1]}$$

where Err_lat_1 represents the first lateral error, expressed for example in Nm;

L represents the width of the corridor 34, expressed for example in Nm; and $S_{Err}$ represents the predefined error threshold.

The first lateral error Err_lat_1 is preferably a maximum lateral error. The maximum lateral error is for example equal to the maximum lateral error for a corridor oriented at 45° relative to North N, annotated as Err_lat_max45. This maximum lateral error at 45° Err_lat_max45 corresponds to the greatest maximum lateral error from among the different maximum lateral errors obtained for different orientations of the corridor 34 relative to North N.

The first lateral error Err_lat_1 included for selecting the resolution R then verifies for example the following equation:

$$\text{Err\_lat\_1} = \text{Err\_lat\_max45} \qquad \text{[Math 2]}$$

where Err_lat_max45 represents the maximum lateral error for a corridor oriented at 45° relative to North N, expressed for example in Nm and verifying the following equation:

$$\text{Err\_lat\_max45} = 2 \cdot \sqrt{2} \cdot \text{Lcell} \qquad \text{[Math 3]}$$

where Lcell represents the width of a respective cell 22 of the grid 21 used for the corresponding terrain data base 16, expressed for example in Nm and verifying the following equation:

$$\text{Lcell} = \frac{R}{60} \qquad \text{[Math 4]}$$

where R represents the resolution, or scale, of the corresponding terrain data base 16, expressed for example in s/a.

Figure 5:
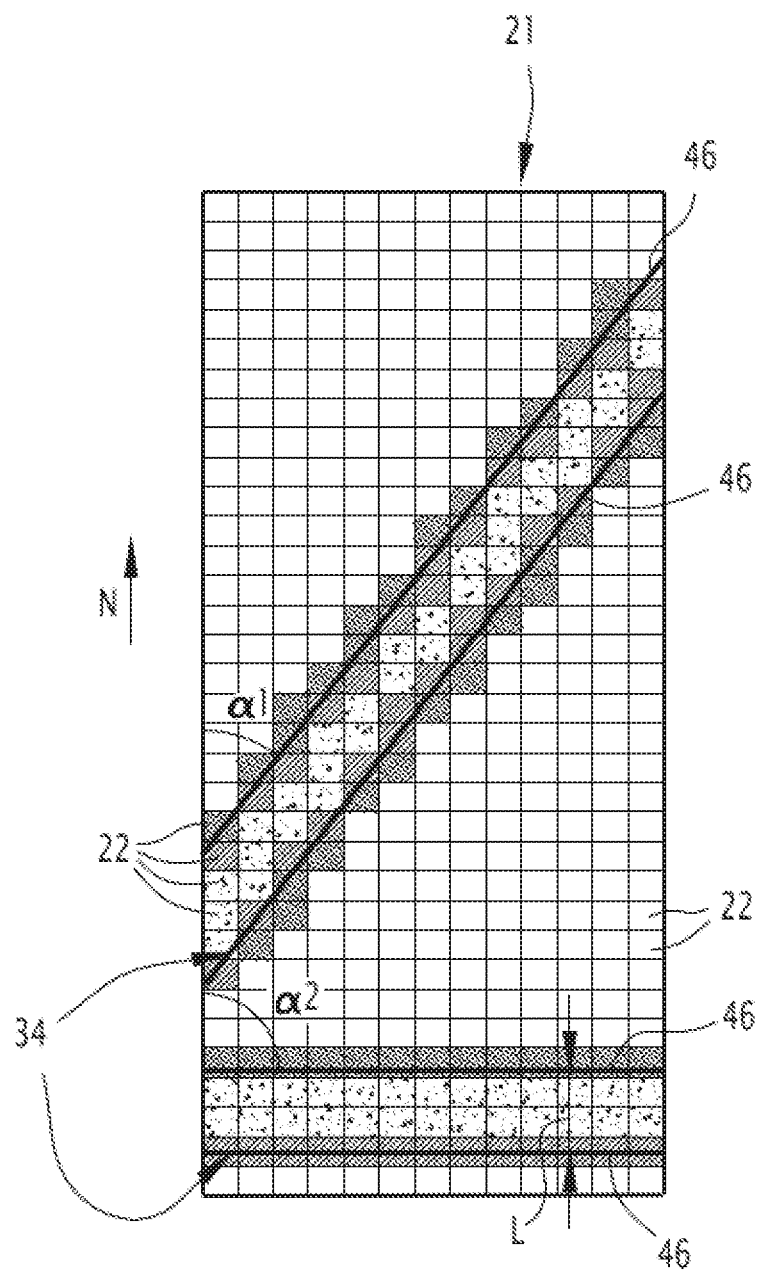
FIG. 5 is a view illustrating lateral imprecision on a corridor edge and according to the orientation of the corridor.

Various corridor 34 orientations relative to North N are illustrated in FIG. 5, where a first corridor 34 forms a first angle α1 relative to North N, and where a second corridor 34 forms a second angle α2 relative to North N. The first corridor 34 is oriented approximately at 30° relative to North, the first angle α1 being substantially equal to 30°. The second corridor 34 is oriented at 90° relative to North, the second angle α2 being substantially equal to 90°. Those skilled in the art will further observe that the lowest maximum lateral error from among the maximum lateral errors for different orientations of the corridor 34 relative to North N is obtained for corridors 34 having an orientation at 0°, 90°, 180°, or indeed 270° relative to North N. The greatest maximum lateral error from among the maximum lateral errors for different orientations of the corridor 34 relative to North N is for its part obtained for corridors 34 oriented at 45°, 135°, 225° or indeed 315° relative to North N.

In FIG. 5, the cells 22 with a mottled filling are cells 22 situated entirely inside the corresponding corridor 34, the cells 22 with a hatched filling are those wherein over half the area is situated inside the corresponding corridor 34, and the cells 22 with a dense filling of dots are those wherein less than half of the area is situated inside the corresponding corridor 34, while having at least a part of the area inside said corridor 34.

FIG. 5 then illustrates that the lateral imprecision at the edge of the corridor 34 is minimal for corridors 34 having an orientation parallel with or perpendicular to North N, i.e. oriented at 0°, 90°, 180°, or indeed 270° relative to North N; and that it is greater for inclined corridors 34 relative to North N, in particular maximum for corridors 34 oriented at 45°, 135°, 225° or indeed 315° relative to North N.

Alternatively, the first lateral error Err_lat_1 included for the selection by the selection module 23 of the resolution R is half the maximum lateral error for a corridor oriented at 45° relative to North N, annotated as Err_lat_max45.

The first lateral error Err_lat_1 included for the selection of the resolution R then verifies for example the following equation:

$$\text{Err\_lat\_1} = \frac{\text{Err\_lat\_max45}}{2} \quad \text{[Math 5]}$$

According to this alternative, the corridor 34 included for computing the ratio RATIO then corresponds to all of the cells 22 situated entirely inside the corresponding corridor 34 and the cells 22 wherein over half the area is situated inside the corresponding corridor 34. In other words, the corridor 34 included for computing the ratio RATIO then corresponds to all of the cells 22 with a mottled filling and the cells 22 with a hatched filling in the example in FIG. 5.

Alternatively, the first lateral error Err_lat_1 included for the selection by the selection module 23 of the resolution R is a mean value of the different possible maximum lateral error values according to the orientation of the corridor 34 relative to North N. According to this alternative, the first lateral error Err_lat_1 included for the selection of the resolution R then verifies the following equation:

$$\text{Err\_lat\_1} = \frac{\text{Err\_lat\_max45} + \text{Err\_lat\_max90}}{2} = \text{Err\_lat\_max} \quad \text{[Math 6]}$$

where Err_lat_45 represents the maximum lateral error for a corridor oriented at 45° relative to North, defined above, and Err_lat_max90 represents the maximum lateral error for a corridor oriented at 90° relative to North N, this error being for example expressed in Nm and verifying the following equation:

$$\text{Err\_lat\_max90} = 2 \cdot L\text{cell} \quad \text{[Math 7]}$$

where Lcell represents the width defined above of a respective cell 22 of the grid 21 used for the corresponding terrain data base 16.

In the light of the above, those skilled in the art will further understand that the maximum lateral error for a corridor oriented at 45° relative to North, annotated as Err_lat_max45, is equal to that for a corridor oriented at 135° relative to North, or to that for a corridor oriented at 225° relative to North, or indeed to that for a corridor oriented at 315° relative to North. Similarly, the maximum lateral error for a corridor oriented at 90° relative to North, annotated as Err_lat_max90, is equal to that for a corridor oriented at 0° relative to North, or to that for a corridor oriented at 180° relative to North, or indeed to that for a corridor oriented at 270° relative to North.

The selection module 23 then makes it possible to obtain table 1 hereinafter wherein the values of cell width Lcell, of maximum lateral error for a corridor oriented at 45° relative to North Err_lat_max45 and of maximum lateral error for a corridor oriented at 90° relative to North Err_lat_max90 are indicated for different values of resolution R.

TABLE 1

| R (s/a) | Lcell (Nm) | Err_lat_max45 (Nm) | Err_lat_max90 (Nm) |
|---|---|---|---|
| 1 | 0.0167 | 0.04714 | 0.03 |
| 3 | 0.05 | 0.14142 | 0.1 |
| 6 | 0.1 | 0.28284 | 0.2 |
| 12 | 0.2 | 0.56569 | 0.4 |
| 24 | 0.4 | 1.13137 | 0.8 |
| 48 | 0.8 | 2.26274 | 1.6 |
| 96 | 1.6 | 4.52548 | 3.2 |

TABLE 1-continued

The selection module 23 is then configured to determine the following table 2 indicating, for each possible value of the resolution R, a corresponding range of values of the width L of the corridor 34, between a minimum corridor width value L_min and a maximum corridor width value L_max, associated with said resolution value R. The values indicated in table 2, given by way of example, correspond to a predefined error threshold $S_{Err}$ equal to 10%, i.e. $S_{Err}=0.1$.

TABLE 2

| R (s/a) | L_min (Nm) | L_max (Nm) |
|---|---|---|
| 1 | 0 | 0.24 |
| 3 | 0.24 | 0.71 |
| 6 | 0.71 | 1.41 |
| 12 | 1.41 | 2.83 |
| 24 | 2.83 | 5.66 |
| 48 | 5.66 | 11.31 |
| 96 | 11.31 | 22.63 |

The selection module 23 is then configured to select the value of the resolution R corresponding, for each respective profile portion 30, to the width L of the corridor 34 associated with said profile portion 30, for example from the ranges of corridor width L values, indicated in table 2 above.

The selection module 23 is also configured to select the terrain data base 16 associated with the value of the resolution R selected for each respective profile portion 30.

The generation module 24 is then configured to generate data, in particular terrain data, for displaying the flight profile 12, using each terrain data base 16 selected by the selection module 23.

The generation module 24 is for example configured to send a message containing a list of respective flight profile portions 30, the width L of the corridor 34 associated with each flight profile portion 30, and the resolution value R to be used for each flight profile 30, these resolution values R having been selected by the selection module 23 according to the width L of the corridor 34 associated with each respective flight portion 30.

The generation module 24 is then configured to receive, in response to the sending of this message and from the extraction device 18, the terrain elevation data corresponding to the message sent, in particular the altitudes of the terrain overflown by the aircraft 6 for the different flight profile portions 30 listed in said message.

The generation module 24 is then configured to generate the display data using these terrain elevation data received, then to transmit these display data to the display module 26 with a view to the display thereof on the display screen 13.

The display module 26 is configured to display, on the display screen 13, the flight profile 12 of the aircraft 6, using the data generated by the generation module 24. The display module 26 is in particular configured to display the vertical flight profile $12_V$ of the aircraft 6, whereon appear the elevation information of the terrain suitable for being overflown by the aircraft 6, this terrain elevation information being generated more precisely by the generation module 24 according to the invention, according to each resolution R selected by the selection module 23.

Figure 4:
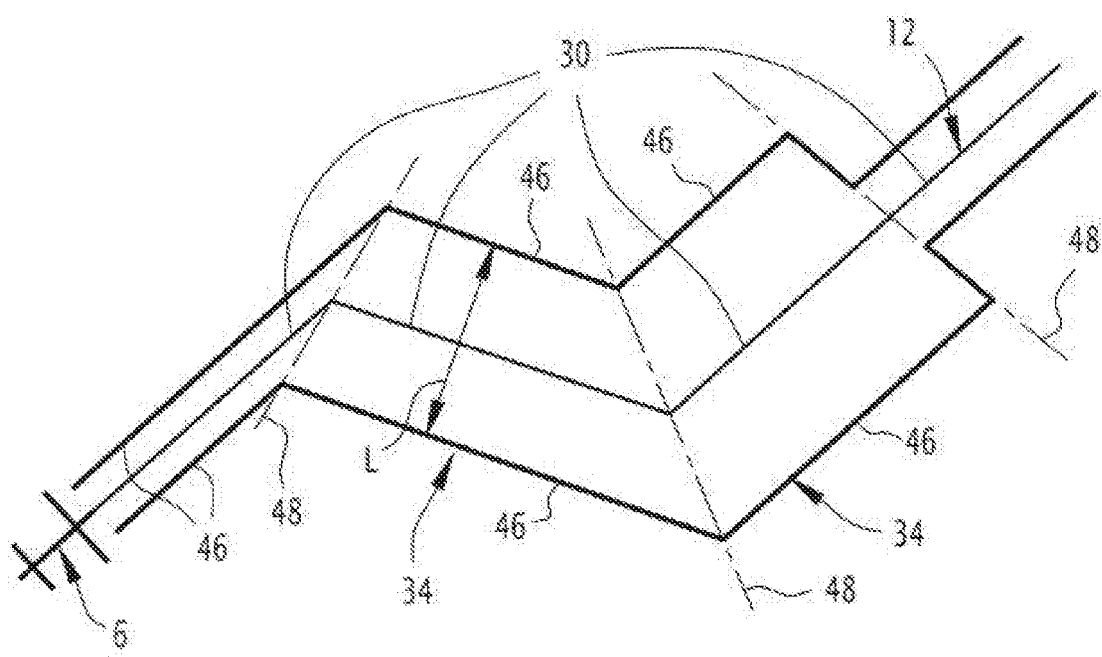
FIG. 4 is a schematic view of another corridor of variable width, associated with another portion of the flight profile.

Optionally additionally, the splitting module 28 is configured to, prior to the selection of the resolution R by the selection module 23, split the flight profile 12 into a plurality of successive profile portions 30, each profile portion 30 being associated with a given corridor 34 width L, as illustrated in FIG. 4. According to this optional addition, the selection module 23 is then configured to select the resolution R for each profile portion 30.

The splitting module 28 is for example configured to identify each profile portion 30 where the corridor 34 associated with said profile portion 30 has between the lateral edges 46 thereof a width L of constant value for said profile portion 30, then to determine a delimitation 48 (represented with a dot and dash line in FIG. 4) between two successive profile portions 30 having separate corridor widths L.

The width L of the corridor 34 for each profile portion 30 corresponds for example to the RNP value for each flight profile portion 30, i.e. for example for each segment of a flight plan of the aircraft 6. The width L of the corridor 34 is typically between 0.2 Nm and 20 Nm. In the example in FIG. 3, the corridor 34 has between the lateral edges 46 thereof a width L of constant value for the entire profile portion 30. In the example in FIG. 4, the flight profile 12 includes four successive profile portions 30, each associated with a corridor 34 of constant width L. In FIG. 4, the corridor width L varies from one profile portion 30 to the next.

Also optionally additionally, the computing module 32 is configured to, after the selection of resolution R made by the selection module 23 and prior to the data generation performed by the generation module 24, compute—for each profile portion 30—a second lateral error Err_lat_2 along the corridor 34 associated with said profile portion 30, the second lateral error Err_lat_2 being dependent on the resolution R selected by the selection module 23 for said profile portion 30.

The second lateral error Err_lat_2 is for example expressed in Nm, and is preferably a median lateral error Err_lat_med which corresponds to a median value of the lateral error regardless of the orientation of the corridor 34 relative to North N.

The computing module 32 is for example configured to compute the median lateral error Err_lat_med according to the following equation:

$$\text{Err\_lat\_med} = \frac{\text{Err\_lat\_max}}{2} = \frac{\text{Err\_lat\_max45} + \text{Err\_lat\_max90}}{4} \quad [\text{Math 8}]$$

where Err_lat_max45, and respectively Err_lat_max90, represent the maximum lateral errors for a corridor oriented at 45°, and respectively at 90°, relative to North, defined above.

The computing module 32 then makes it possible to obtain table 3 hereinafter wherein the values of the median lateral error Err_lat_med, computed according to the equation cited above, are indicated for different resolution values R.

TABLE 3

| R (s/a) | Err_lat_med (Nm) |
|---|---|
| 1 | 0.020 |
| 3 | 0.060 |

TABLE 3-continued

| R (s/a) | Err_lat_med (Nm) |
|---|---|
| 6 | 0.121 |
| 12 | 0.241 |
| 24 | 0.483 |
| 48 | 0.966 |
| 96 | 1.931 |

Alternatively, the computing module 32 is configured to acquire the angle of orientation α relative to North N for each of the profile portions 30 forming the flight profile 12 in question, then to compute the median lateral error Err_lat_med in the form of a mean, for example an arithmetic mean, of the different maximum lateral error values for each of the orientations acquired.

Also alternatively, the computing module 32 is configured to determine a statistical law of the orientations of the corridor 34 relative to North N for the flight profile portions 30 of different flight profiles 12, then to compute the median lateral error Err_lat_med using this statistical law.

According to this optional addition, the generation module 24 is then configured to generate the display data for each profile portion 30 according to a corrected width $L_{corr}$ of the corridor 34, the corrected width $L_{corr}$ being equal to the width L of the corridor 34, i.e. the default width thereof, minus the second lateral error Err_lat_2 computed previously by the computing module 32.

The corrected width $L_{corr}$, expressed in Nm, then verifies for example the following equation:

$$L_{corr} = L - \text{Err\_lat\_2} \quad [\text{Math 9}]$$

where L represents the default width of the corridor 34, expressed in Nm, and Err_lat_2 represents the second lateral error, expressed for example in Nm;

in particular the following equation, when the second lateral error Err_lat_2 is the median lateral error Err_lat_med:

$$L_{corr} = L - \text{Err\_lat\_med} \quad [\text{Math 10}]$$

where L represents the default width of the corridor 34, expressed in Nm, and Err_lat_med represents the median lateral error defined above.

The corridor 34 extends laterally on either side of the flight profile 12, in particular on either side of each respective profile portion 30. The corridor 34 corresponds to the terrain data zone included to subsequently represent the terrain data elevation during the display of the flight profile 12, particularly during the display of the vertical flight profile $12_V$.

Figure 3:
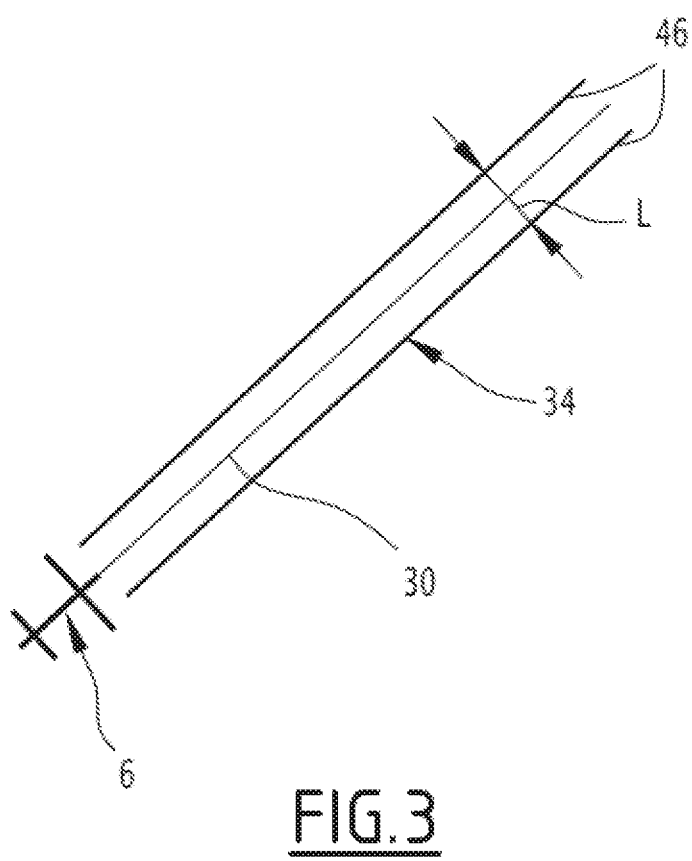
FIG. 3 is a schematic view of a corridor of constant width, associated with a respective portion of the flight profile.

When the mode selected for displaying the flight profile 12 is tracking mode, the width L of the corridor 34 is generally of constant value, as represented in FIG. 3, where the flight profile 12 represented is the horizontal flight profile $12_H$.

When the selected display mode is flight plan mode, the width L of the corridor 34 is generally of variable width, as represented in FIG. 4, where the flight profile 12 represented is the horizontal flight profile $12_H$.

Also optionally additionally, the limiting module 36 is configured to, prior to the selection of resolution R performed by the selection module 23, limit the width L of the corridor 34. The limited width $L_{ecr}$ is equal to the width L of the corridor if said width L is less than a predefined maximum corridor width $L_{max}$, and is otherwise equal to said predefined maximum width $L_{MAX}$.

According to this optional addition, the limiting module 36 is then configured to compute the limited width $L_{ecr}$ according to the following equation:

$$L_{ecr} = \begin{cases} L & \text{if } L < L_{MAX} \\ L_{MAX} & \text{if } L \geq L_{MAX} \end{cases} \quad \text{[Math 11]}$$

where L represents the default width of the corridor 34 and $L_{max}$ represents the predefined maximum corridor width, each expressed in Nm.

The predefined maximum width $L_{MAX}$ is preferably between 3 Nm and 10 Nm, more preferably between 4 Nm and 8 Nm, and more preferably equal to 4 Nm.

According to this optional addition, the selection module 23 is then configured to select each resolution R according to the limited width $L_{ecr}$ of the corridor 34 associated with each respective flight profile portion 30. In other words, according to this optional addition, the corridor 34 width included to determine the value of the resolution R, for example using table 2 above, is then the limited width $L_{ecr}$, rather than the default width L, of said corridor 34.

According to this further optional addition, the generation module 24 is also configured to generate the display data for each profile portion 30 according to said limited width $L_{ecr}$ of the corridor 34, rather than according to the default width L thereof.

Also optionally additionally, when the management device 20 comprises both the computing module 32 and the limiting module 36, then the generation module 24 is preferably configured to generate the display data for each profile portion 30 according to a corrected width $L_{corr}$ of the corridor 34 which is then equal to the limited width $L_{ecr}$ of the corridor 34 minus the second lateral error Err_lat_2.

According to this further optional addition, the corrected width $L_{corr}$, expressed in Nm, then verifies for example the following equation:

$$L_{corr} = L_{ecr} - \text{Err\_lat\_2} \quad \text{[Math 12]}$$

where $L_{ecr}$ represents the limited width of the corridor 34, expressed in Nm Err_lat_2 represents the second lateral error, expressed for example in Nm;

in particular the following equation, when the second lateral error Err_lat_2 is the median lateral error Err_lat_med:

$$L_{corr} = L_{ecr} - \text{Err\_lat\_med} \quad \text{[Math 13]}$$

where $L_{ecr}$ represents the limited width of the corridor 34, expressed in Nm, and Err_lat_med represents the median lateral error defined above.

Figure 7:
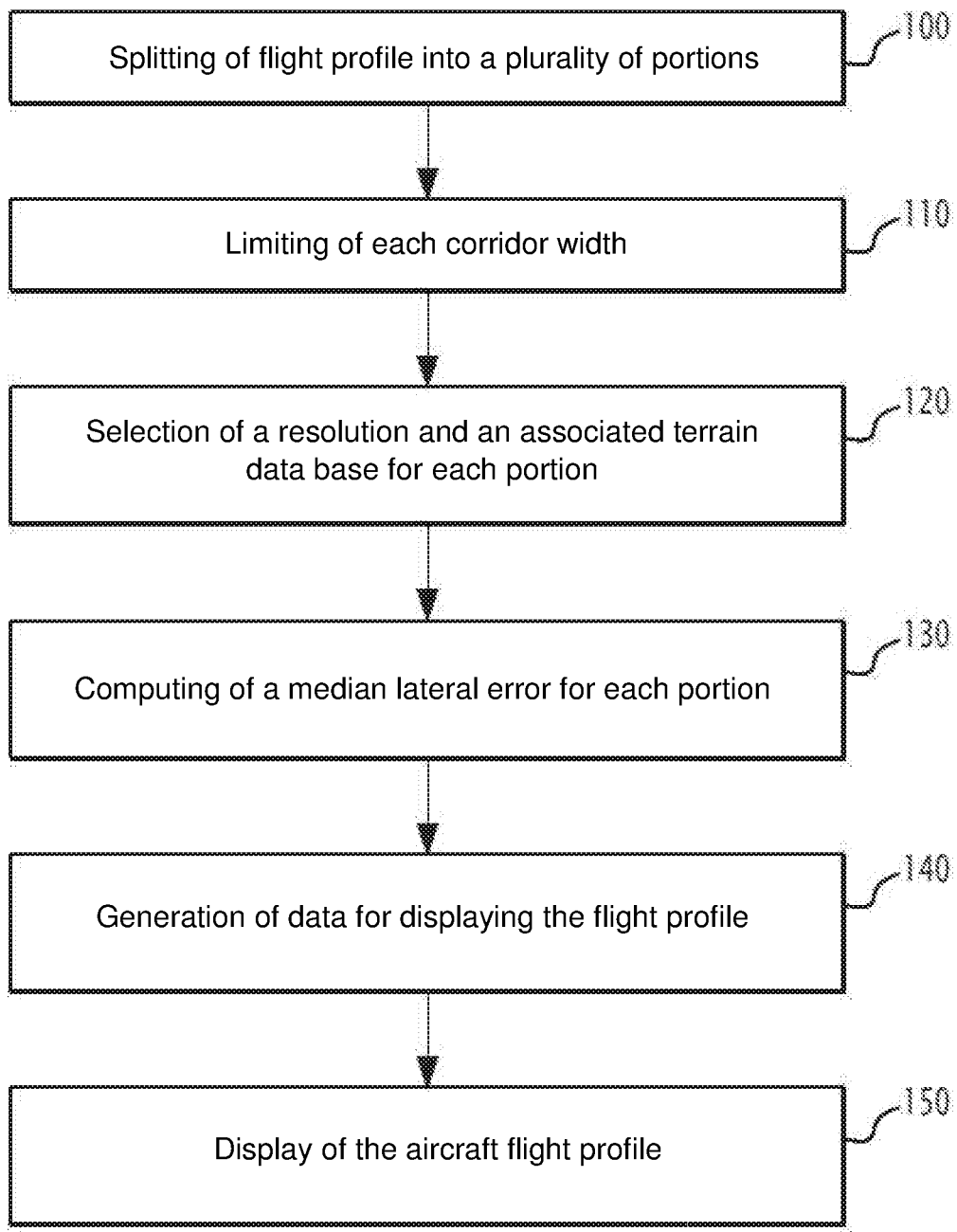
FIG. 7 is a flow chart of a method, according to the invention, for managing the display of the aircraft flight profile.

The operation of the display system 10, and in particular the display management device 20, according to the invention will now be described with reference to FIG. 7 representing a flow chart of the method, according to the invention, for managing the display of the flight profile 12.

During an optional initial step 100, the management device 20 splits, via the splitting module 28 thereof, the flight profile 12 into a plurality of successive profile portions 30, where each profile portion 30 has a given corridor 34 width L, i.e. where each profile portion 30 is associated with a corridor 34 wherein the width L is of constant value along this profile portion 30.

The management device 20 then limits, during an optional step 110 and via the limiting module 36 thereof, each corridor width 34, i.e. the width of the corridor 34 corresponding to each respective flight profile portion 30. The limiting module 36 then computes the limited width $L_{ecr}$ for each respective profile portion 30, said limited width $L_{ecr}$ verifying equation 11 above, i.e. being equal to the default width L of the corridor if said width L is less than the predefined maximum width $L_{MAX}$, and otherwise to the predefined maximum width $L_{MAX}$.

The management device 20 then selects, via the selection module 23 thereof and during the subsequent step 120, a value of the resolution R, as well as the terrain data base 16 associated with the selected resolution value R, for each profile portion 30. As described above, the selection module 23 selects the value of the resolution R for each flight profile portion 30 according to the width L of the corridor 34 associated with said flight profile portion 30, for example using table 2 above.

This selection of the resolution value R is, if applicable, performed according to the limited width $L_{ecr}$ of the corridor 34, rather than according to the default width L thereof.

The selected resolution R corresponds preferably to the ratio RATIO greater than the predefined error threshold $S_{Err}$, the ratio RATIO being equal to the first lateral error Err_lat_1 divided by the width L of the corridor.

Selecting the resolution R so as to have preferably the ratio RATIO greater than the predefined error threshold $S_{Err}$, makes it possible to have a resolution R adapted to the width L of the corridor and offering a good compromise between the degree of precision and quantity of computing resources required. In other words, the ratio RATIO makes it possible to determine the corridor width L from which a less resolved terrain data base 16, i.e. at a higher value of the resolution R, should be used to retain the compromise cited above.

By way of example, according to the values indicated in table 2, the terrain data base 16 with a resolution of 1 s/a (R=1) will be used for L 0.24 Nm, and the terrain data base 16 with a resolution of 3 s/a (R=3) will subsequently be used for L 0.71 Nm, i.e. for 0.24 Nm<L≤0.71 Nm, and so on.

Figure 6:
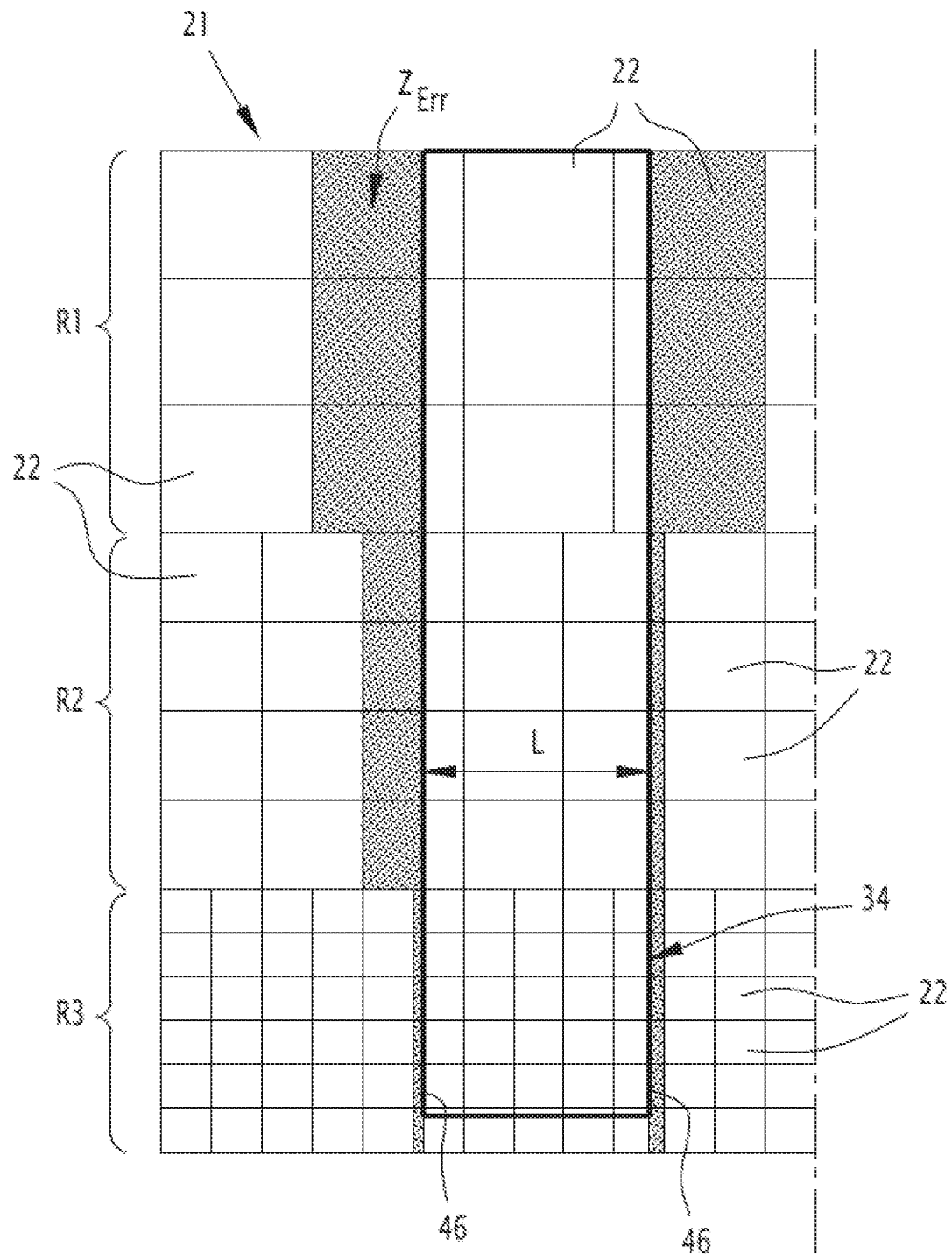
FIG. 6 is a view illustrating a lateral error along the corridor, this lateral error varying according to the resolution of the associated terrain data base.

FIG. 6 then shows the influence of the resolution R on the lateral error along the corridor 34. FIG. 6 illustrates indeed, on one hand, cells 22 for different values of the resolution R corresponding to different terrain data bases 16, these values being respectively annotated as R1 for the greatest resolution value in s/a (corresponding to the least resolved, i.e. the least detailed, data base), R2 for the intermediate resolution value, and R3 for the lowest resolution value in s/a (corresponding to the most resolved, i.e. the most detailed, data base), and, on the other, the lateral error along the corridor 34, which is materialized by an error zone $Z_{Err}$ corresponding to the difference between the cells 22 which are at least partially inside the corridor 34 and the corridor 34 itself delimited by the lateral edges 46 thereof. Those skilled in the art will then observe that the lateral error along the corridor 34 varies according to the resolution R of the associated terrain data base 16, more specifically that it increases with the value of the resolution R, or scale, expressed in s/a. Indeed, the area of the error zone $Z_{Err}$ increases when the value in s/a of the resolution R, i.e. of the scale of the terrain data base 16 increases, i.e. when the corresponding terrain data base 16 is less resolved, or less detailed.

During the optional following step 130, the management device 20 then computes, via the computing module 32 thereof, the second lateral error Err_lat_2, preferably the median lateral error Err_lat_med, along the corridor 34 associated with each profile portion 30. The second lateral error Err_lat_2 is dependent on the resolution R selected for said profile portion 30.

When the second lateral error Err_lat_2 is the median lateral error Err_lat_med, it verifies for example equation 8 above.

The management device 20 then generates, during the following step 140 and via the generation module 24 thereof, the data with a view to displaying the flight profile 12, in particular the elevation data of the terrain suitable for being overflown by the aircraft 6, this data generation being carried out using each terrain data base 16 selected during the selection step 120.

Optionally additionally, when the second lateral error Err_lat_2 has been computed during the optional computing step 130, the generation module 24 generates the data for each profile portion 30 according to the corrected width $L_{corr}$ of the corridor 34, said corrected width $L_{corr}$ being equal to the corridor width L minus the second lateral error Err_lat_2 computed, and then verifying equation 9 above, or equation 10 when the computed second lateral error Err_lat_2 is the median lateral error Err_lat_med.

Also optionally additionally, when the optional limiting step 110 has been carried out and the limited width $L_{ecr}$ has been computed for each corridor 34, then the generation module 24 generates the display data according to said limited width $L_{ecr}$ of the corridor 34 for each respective profile portion 30.

Those skilled in the art will further understand that when the optional steps of limiting 110 and computing 130 are both carried out, the corrected width $L_{corr}$ is then equal to the limited corridor width $L_{ecr}$ minus the computed second lateral error Err_lat_2, and then verifying equation 12 above, or equation 13 when the computed second lateral error Err_lat_2 is the median lateral error Err_lat_med. The data are then generated for said corrected width $L_{corr}$ thus computed.

The management device 20 then displays, during the following step 150 and via the display module 26 thereof, the flight profile 12 on the display screen 13, in particular the vertical flight profile $12_V$, using the data generated during the generation step 140.

The management device 20 and the display management system according to the invention then make it possible to select each resolution R according to a corresponding width L of the corridor 34 associated with each respective flight profile portion 30. This selection, for each respective flight profile portion 30, of the value of the resolution R, and of the associated terrain data base 16, then makes it possible to have a good compromise between the degree of precision and the quantity of computing resources needed to process the data from the terrain data base(s) 16 selected. Indeed, the greater the corridor 34 width in question, the lower the selected resolution value R, and conversely, the narrower the corridor 34 width in question, the greater the selected resolution R, which will make it possible to have a superior degree of precision given the narrow corridor 34 width.

The management device 20 and the management method according to the invention also make it possible to estimate more readily the quantity of terrain data to be processed for each respective profile portion 30, so as to subsequently display the flight profile 12, and in particular have a substantially equivalent quantity of terrain data from one flight profile portion 30 to another, by selecting a lower resolution value R p\when the width in question of the corridor 34 increases.

It is thus understood that the method and the electronic display management device 20 according to the invention make it possible to offer a precise display of the terrain suitable for being overflown by the aircraft 6, while not needing excessive computing resources.

The invention claimed is:

1. A method for managing a display of a flight profile of an aircraft, the method being carried out by an electronic management device intended to be connected to a set of at least one terrain data base, the set including a plurality of terrain data bases with different resolutions, each terrain data base having a respective resolution,
the method comprising steps:
   splitting the flight profile into a plurality of successive profile portions, each profile portion being associated with a given corridor width,
   selecting, for each profile portion, a respective resolution, as well as the terrain data base associated with each selected resolution, each resolution being selected according to a width of a corridor associated with a respective portion of the flight profile,
   generating data for displaying the flight profile and using each terrain data base selected,
   wherein, during the selection step, the selected resolution corresponds to a ratio greater than a predefined error threshold, the ratio being equal to a first lateral error along the corridor associated with the respective profile portion divided by the width of the corridor, the first lateral error being dependent on the resolution.

2. The method according to claim 1, wherein the first lateral error along the corridor associated with the respective profile portion is a maximum lateral error.

3. The method according to claim 1, wherein the method further comprises, for each profile portion, after the selection step and prior to the generation step, a step of computing a second lateral error, preferably a median lateral error, along the corridor associated with said profile portion, the second lateral error being dependent on the resolution selected for said profile portion.

4. The method according to claim 3, wherein the second lateral error is a median lateral error along the corridor associated with said profile portion.

5. The method according to claim 3, wherein, during the generation step, the data are then generated, for each profile portion, according to a corrected width of the corridor, the corrected width being equal to the width of the corridor minus the computed second lateral error.

6. The method according to claim 1, wherein the method further comprises, prior to the selection step, a step of limiting each corridor width, the limited width being equal to the width of the corridor if said width is less than a predefined maximum corridor width, and to the predefined maximum corridor width otherwise.

7. The method according to claim 6, wherein the predefined maximum corridor width is between 3 Nm and 10 Nm.

8. The method according to claim 7, wherein the predefined maximum corridor width is between 4 Nm and 8 Nm.

9. The method according to claim 8, wherein the predefined maximum corridor width is equal to 4 Nm within plus or minus 10%.

10. The method according to claim 6, wherein, during the selection step, each resolution is selected according to the limited width of the corridor associated with the respective portion of the flight profile.

11. The method according to claim 6, wherein, during the generation step, the data are generated, for each profile portion, according to the limited width of the corridor.

12. The method according to claim 1, wherein the method further comprises a step of displaying the flight profile of the aircraft, using the data generated during the generation step.

13. Non-transitory computer-readable medium including a computer program comprising software instructions which, when executed by a computer, carry out a display management method according to claim 1.

14. Electronic management device configured to manage a display of a flight profile of an aircraft, the device being intended to be connected to a set of at least one terrain data base, the set including a plurality of terrain data bases with different resolutions, each terrain data base having a respective resolution, and comprising:
- a splitting module configure to split the flight profile into a plurality of successive profile portions, each profile portion being associated with a given corridor width,
- a selection module configured to select, for each profile portion, a respective resolution, as well as the terrain data base associated with each selected resolution, each resolution being selected according to a width of a corridor associated with a respective portion of the flight profile,
- a generation module configured to generate data for displaying the flight profile and using each terrain data base selected, wherein the selected resolution corresponds to a ratio greater than a predefined error threshold, the ratio being equal to a first lateral error along the corridor associated with the respective flight profile divided by the width of the corridor, the first lateral error being dependent on the resolution.

15. The electronic management device according to claim 14, wherein the first lateral error along the corridor associated with the respective profile portion is a maximum lateral error.

16. Electronic system for displaying a flight profile of an aircraft, the system comprising:
- a display screen,
- a set of at least one terrain data base, each terrain data base having a respective resolution, and
- an electronic management device configured to manage the display of the flight profile on the display screen, the electronic management device being connected to the display screen and to a set of data base(s), wherein the electronic management device is according to claim 14.

* * * * *